US010893566B2

(12) United States Patent
Zhou et al.

(10) Patent No.: US 10,893,566 B2
(45) Date of Patent: Jan. 12, 2021

(54) METHOD FOR RECEIVING BEAM RECOVERY REQUEST AND NETWORK DEVICE

(71) Applicant: HUAWEI TECHNOLOGIES CO., LTD., Guangdong (CN)

(72) Inventors: Enzhi Zhou, Chengdu (CN); Gao Xiang, Chengdu (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,498

(22) Filed: Nov. 4, 2019

(65) Prior Publication Data

US 2020/0068644 A1 Feb. 27, 2020

Related U.S. Application Data

(63) Continuation of application No. PCT/CN2018/085113, filed on Apr. 28, 2018.

(30) Foreign Application Priority Data

May 5, 2017 (CN) .......................... 2017 1 0312732

(51) Int. Cl.
*H04W 76/19* (2018.01)
*H04B 7/06* (2006.01)
(Continued)

(52) U.S. Cl.
CPC ............ *H04W 76/19* (2018.02); *H04B 7/061* (2013.01); *H04B 7/0617* (2013.01);
(Continued)

(58) Field of Classification Search
CPC ... H04W 76/19; H04W 72/046; H04W 24/02; H04W 72/04; H04W 72/08; H04B 7/061;
(Continued)

(56) References Cited

U.S. PATENT DOCUMENTS

2011/0317626 A1* 12/2011 Cho .................. H04L 1/188
370/328
2013/0182683 A1 7/2013 Seol et al.
(Continued)

FOREIGN PATENT DOCUMENTS

CN 102396164 A 3/2012
CN 103596195 A 2/2014
(Continued)

OTHER PUBLICATIONS

Samsung, "Discussion on Beam Measurement and Tracking for 5G New Radio Interface in mmWave Frequency Bands", 3GPP TSG RAN WG2 # 93bis R2-162226, Apr. 15-19, 2016 (Apr. 15, 2016), 5 pages.
(Continued)

*Primary Examiner* — Vineeta S Panwalkar
(74) *Attorney, Agent, or Firm* — Fish & Richardson P.C.

(57) ABSTRACT

The present disclosure relates to methods for sending a message. One example method is applied to a terminal device and includes sending a request sequence to a network device, receiving a response message sent by the network device, where the response message indicates a time-frequency resource that the network device allocates to the terminal device in response to the request sequence, and sending an indication message to the network device on the time-frequency resource, where the indication message indicates that the request sequence is used for at least one of the following: requesting beam recovery, requesting data scheduling, and requesting beam adjustment.

18 Claims, 11 Drawing Sheets

(51) Int. Cl.
  *H04W 72/04* (2009.01)
  *H04L 5/00* (2006.01)
(52) U.S. Cl.
  CPC ......... *H04B 7/0626* (2013.01); *H04B 7/0639* (2013.01); *H04B 7/0695* (2013.01); *H04W 72/046* (2013.01); *H04L 5/0007* (2013.01)
(58) Field of Classification Search
  CPC .. H04B 7/0617; H04B 7/0626; H04B 7/0639; H04B 7/0695; H04L 5/0007
  See application file for complete search history.

(56) References Cited

U.S. PATENT DOCUMENTS

| | | |
|---|---|---|
| 2013/0258885 A1 | 10/2013 | Yu et al. |
| 2014/0011445 A1 | 1/2014 | Trainin et al. |
| 2014/0314053 A1 | 10/2014 | Liu et al. |
| 2016/0190686 A1 | 6/2016 | Gao et al. |
| 2018/0109307 A1 | 4/2018 | Huang et al. |
| 2020/0022152 A1* | 1/2020 | Wang .................. H04W 72/085 |
| 2020/0092785 A1* | 3/2020 | Yang ..................... H04W 76/19 |
| 2020/0120714 A1* | 4/2020 | Wang .................. H04W 80/08 |

FOREIGN PATENT DOCUMENTS

| | | |
|---|---|---|
| CN | 103718591 A | 4/2014 |
| CN | 104205911 A | 12/2014 |
| WO | 2016191994 A1 | 12/2016 |

OTHER PUBLICATIONS

PCT International Search Report and Written Opinion in International Application No. PCT/CN2018/085,113, dated Aug. 1, 2018, 18 pages (With English Translation).
Samsung, "Discussion on recovery from beam failure", 3GPP Draft; R1-1705343, Apr. 3-7, 2017, 6 pages.
Samsung, "NR beam recovery procedure", 3GPP Draft; R2-1703712, Apr. 3-7, 2017, 6 pages.
Partial Supplemental European Search Report issued in European Application No. 187939131 dated Jan. 22, 2020, 14 pages.

* cited by examiner

METHOD FOR RECEIVING BEAM RECOVERY REQUEST AND NETWORK DEVICE

CROSS-REFERENCE TO RELATED APPLICATIONS

This application is a continuation of International Application No. PCT/CN2018/085113, filed on Apr. 28, 2018 which claims priority to Chinese Patent Application No. 201710312732.8, filed on May 5, 2017. The disclosures of the aforementioned applications are hereby incorporated by reference in their entireties.

TECHNICAL FIELD

The present invention relates to the field of communications technologies, and in particular, to a method for receiving a beam recovery request and a network device.

BACKGROUND

To satisfy continuously growing communications service requirements, mobile communications systems are developing, for example, spectrum efficiency is improved, to resolve a problem of spectrum resource shortage in an existing mobile communications system. However, spectrum efficiency improvement alone is insufficient to satisfy the continuously growing communications service requirements.

The foregoing problem can be resolved by using a high frequency band. Deploying, in a high frequency band with a carrier frequency greater than 6 GHz, a 5th generation (5G) mobile communications system that is being standardized is being considered. The high frequency band includes a large quantity of available frequency resources. This can resolve the problem of frequency shortage in the existing mobile communications system, thereby greatly increasing a system capacity. However, in the high frequency band, a path loss of a signal increases greatly, and therefore it is necessary to find a method for increasing received signal power.

FIG. 1 is a schematic diagram of sending signals. As shown in FIG. 1, when a low frequency band or an intermediate frequency band is used, signals may be sent in all directions in a space or at a relatively wide angle; when a high frequency band is used, in virtue of a relatively small carrier wavelength of a high frequency communications system, antenna arrays including a large quantity of antenna elements may be disposed at a transmit end and a receive end. The transmit end sends signals by using a specific beamforming weight, so that the sent signals form a beam with a spatial directivity, and the receive end receives the signals through an antenna array by using a specific beamforming weight. In this way, receive power of the signals at the receive end can be improved, to reduce a path loss.

SUMMARY

When a network device communicates with a terminal device by using a beam, because the terminal device moves or rotates or an environment changes, the terminal device may detect a beam failure. In this case, the terminal device initiates a beam recovery request to the network device. However, when the network device communicates with the terminal device by using a beam obtained after adjustment, the terminal device cannot learn of a time-frequency resource for initiating the beam recovery request to the network device.

To resolve the foregoing technical problem, according to a first aspect, an embodiment of this application provides a method for receiving a beam recovery request. The method is applied to a network device and includes: sending a first signal to a terminal device by using a first beam; receiving first index information sent by the terminal device, where the first index information indicates an index number of the first signal; sending a first notification message to the terminal device based on the first index information, where the first notification message includes second index information, the second index information indicates an index number of a second signal, and the index number of the second signal corresponds to the first beam; and receiving, on a time-frequency resource corresponding to the first beam, the beam recovery request sent by the terminal device. In this embodiment of this application, after beam adjustment, the network device sends the notification message to the terminal device to notify the terminal device of the index number of the periodic sweep beam obtained after adjustment. After receiving the notification message, the terminal device can determine the index number of the periodic sweep beam aligned with a beam used to initiate the beam recovery request, and further determine the time-frequency resource corresponding to the periodic sweep beam, so as to send a request sequence on the correct time-frequency resource. In this way, the network device can correctly receive the beam recovery request initiated by the terminal device.

With reference to the first aspect, in a possible implementation, before the sending a first signal to a terminal device by using a first beam, the method further includes: sending the second signal to the terminal device by using the first beam; and receiving third index information sent by the terminal device, where the third index information indicates the index number of the second signal.

With reference to the first aspect and all implementations of the first aspect, in a possible implementation, after the sending a first notification message to the terminal device, the method further includes: sending a third signal to the terminal device by using a second beam; receiving fourth index information sent by the terminal device, where the fourth index information indicates an index number of the third signal; and sending a second notification message to the terminal device based on the fourth index information, where the second notification message includes fifth index information, the fifth index information indicates a difference between an index number of a fourth signal and the index number of the second signal, and the index number of the fourth signal corresponds to the second beam. In this embodiment of this application, after beam adjustment, the network device sends the notification message to the terminal device to notify the terminal device of the difference between the index number of the periodic sweep beam obtained after adjustment and the index number, of the periodic sweep beam used before adjustment, in the previous notification message. This can save downlink signaling resources compared with notifying the terminal device of the index number of the periodic sweep beam obtained after adjustment.

With reference to the first aspect and all the implementations of the first aspect, in an implementation, that the second index information indicates an index number of a second signal includes: the second index information indicates that the first signal and the second signal are quasi co-located.

With reference to the first aspect and all the implementations of the first aspect, in an implementation, the first signal includes a first channel state information-reference signal CSI-RS, the second signal includes a second CSI-RS or a first synchronization signal block SS block, the third signal includes a third CSI-RS, and the fourth signal includes a fourth CSI-RS or a second SS block.

According to a second aspect, an embodiment of this application provides a method for sending a message. The method is applied to a terminal device and includes: sending a request sequence to a network device; receiving a response message sent by the network device, where the response message indicates a time-frequency resource that the network device allocates to the terminal device in response to the request sequence; and sending an indication message to the network device on the time-frequency resource, where the indication message indicates that the request sequence is used for at least one of the following: requesting beam recovery, requesting data scheduling, and requesting beam adjustment. In this embodiment of this application, the request sequence sent by the terminal device to the network device is not necessarily used for requesting beam recovery, but may be reused for requesting beam adjustment and/or requesting data scheduling. The network device allocates the time-frequency resource to the terminal device in response to the request sequence. The terminal device sends the indication message to the network device on the allocated time-frequency resource, and indicates an actual function of the request sequence in the indication message. The request sequence is reused for several possible requests, so that a large quantity of sequence resources are saved.

With reference to the second aspect and all implementations of the second aspect, in an implementation, when the request sequence is used at least for requesting beam recovery, the indication message further includes at least one of the following: a beam failure cause, a quantity of failed beams, a beam failure status, an index number of an available beam, and quality of the available beam. In this embodiment of this application, the indication message not only indicates the actual function of the request sequence, but also indicates auxiliary information. This further saves signaling resources.

With reference to the second aspect and all the implementations of the second aspect, in an implementation, the quantity of failed beams is indicated by using a field of the quantity of failed beams; and that the field of the quantity of failed beams is 00, 01, 10, or 11 indicates that the quantity of failed beams is 1, 2, 3, or 4, respectively.

With reference to the second aspect and all the implementations of the second aspect, in an implementation, the beam failure status is indicated by using a field of the beam failure status; and that the field of the beam failure status is 00 or 01 indicates that the beam failure status is that a current serving beam fails or all serving beams fail, respectively.

With reference to the second aspect and all the implementations of the second aspect, in an implementation, when the request sequence is used at least for requesting beam recovery, before the sending a request sequence to a network device, the method further includes: receiving a first signal sent by the network device by using a first beam; and detecting that a received signal strength of the first signal is less than or equal to a first preset threshold.

With reference to the second aspect and all the implementations of the second aspect, in an implementation, after the detecting that a received signal strength of the first signal is less than or equal to a first preset threshold, the method further includes: receiving a second signal sent by the network device by using a second beam; detecting that a received signal strength of the second signal is greater than or equal to a second preset threshold; and sending first index information to the network device, where the first index information indicates an index number of the second signal. In this embodiment of this application, when the terminal device detects a beam failure, the terminal device further needs to detect existence of an available beam before initiating a beam recovery request to the network device. This can avoid a waste of signaling resources that is caused when there is no available beam after the terminal device initiates the beam recovery request.

With reference to the second aspect and all the implementations of the second aspect, in an implementation, when the request sequence is used at least for requesting data scheduling, the indication message further includes a buffer status report BSR. In this embodiment of this application, the indication message not only indicates the actual function of the request sequence, but also indicates auxiliary information. This further saves signaling resources.

With reference to the second aspect and all the implementations of the second aspect, in an implementation, after the sending a request sequence to a network device, the method further includes: if the response message is not received within a preset time, resending the request sequence to the network device; and when a quantity of times of sending the request sequence to the network device reaches a preset maximum quantity of sending times, performing one of the following: initiating a random access process, reporting a beam recovery failure, and reporting a radio link failure.

With reference to the second aspect and all the implementations of the second aspect, in an implementation, the response message is scrambled by using a radio network temporary identifier RNTI, and the RNTI is obtained by using a preset function and at least one of the following variables: an index number of the request sequence, an index number of a time resource for sending the request sequence, and an index number of a frequency resource for sending the request sequence. In this embodiment of this application, there is a specific probability that the network device incorrectly determines which terminal device sends the request sequence, and a terminal device that does not send the request sequence also decodes the response message after receiving the response message. To avoid this case, the network device may scramble the response message by using the RNTI. In this way, once detecting the RNTI after receiving the response message, the terminal device that does not send the request sequence does not decode the response message.

With reference to the second aspect and all the implementations of the second aspect, in an implementation, the indication message is carried by at least one media access control control element MAC CE.

According to a third aspect, an embodiment of this application provides a network device, including: a transceiver; a memory, configured to store program code including a computer operation instruction; and a processor, configured to execute the computer operation instruction, to control the transceiver to perform the following operations: receiving first index information sent by a terminal device, where the first index information indicates an index number of a first signal; sending a first notification message to the terminal device based on the first index information, where the first notification message includes second index information, the second index information indicates an index number of a second signal, and the index number of the second signal corresponds to a first beam; and receiving, on a time-frequency resource corresponding to the first beam, a beam recovery request sent by the terminal device.

With reference to the third aspect and all implementations of the third aspect, in an implementation, the processor is further configured to control the transceiver to perform the following operations: sending the second signal to the terminal device by using the first beam; and receiving third index information sent by the terminal device, where the third index information indicates the index number of the second signal.

With reference to the third aspect and all the implementations of the third aspect, in an implementation, the processor is further configured to control the transceiver to perform the following operations: sending a third signal to the terminal device by using a second beam; receiving fourth index information sent by the terminal device, where the fourth index information indicates an index number of the third signal; and sending a second notification message to the terminal device based on the fourth index information, where the second notification message includes fifth index information, the fifth index information indicates a difference between an index number of a fourth signal and the index number of the second signal, and the index number of the fourth signal corresponds to the second beam.

With reference to the third aspect and all the implementations of the third aspect, in an implementation, that the second index information indicates an index number of a second signal includes: the second index information indicates that the first signal and the second signal are quasi co-located.

With reference to the third aspect and all the implementations of the third aspect, in an implementation, the first signal includes a first channel state information-reference signal CSI-RS, the second signal includes a second CSI-RS or a first synchronization signal block SS block, the third signal includes a third CSI-RS, and the fourth signal includes a fourth CSI-RS or a second SS block.

According to a fourth aspect, an embodiment of this application provides a terminal device, including: a transceiver; a memory, configured to store program code including a computer operation instruction; and a processor, configured to execute the computer operation instruction, to control the transceiver to perform the following operations: sending a request sequence to a network device; receiving a response message sent by the network device, where the response message indicates a time-frequency resource that the network device allocates to the terminal device in response to the request sequence; and sending an indication message to the network device on the time-frequency resource, where the indication message indicates that the request sequence is used for at least one of the following: requesting beam recovery, requesting data scheduling, and requesting beam adjustment.

With reference to the fourth aspect and all implementations of the fourth aspect, in an implementation, when the request sequence is used at least for requesting beam recovery, the indication message further includes at least one of the following: a beam failure cause, a quantity of failed beams, a beam failure status, an index number of an available beam, and quality of the available beam.

With reference to the fourth aspect and all the implementations of the fourth aspect, in an implementation, the quantity of failed beams is indicated by using a field of the quantity of failed beams; and that the field of the quantity of failed beams is 00, 01, 10, or 11 indicates that the quantity of failed beams is 1, 2, 3, or 4, respectively.

With reference to the fourth aspect and all the implementations of the fourth aspect, in an implementation, the beam failure status is indicated by using a field of the beam failure status; and that the field of the beam failure status is 00 or 01 indicates that the beam failure status is that a current serving beam fails or all serving beams fail, respectively.

With reference to the fourth aspect and all the implementations of the fourth aspect, in an implementation, when the request sequence is used at least for requesting beam recovery, the processor is further configured to control the transceiver to perform the following operations: receiving a first signal sent by the network device by using a first beam; and detecting that a received signal strength of the first signal is less than or equal to a first preset threshold.

With reference to the fourth aspect and all the implementations of the fourth aspect, in an implementation, the processor is further configured to control the transceiver to perform the following operations:

receiving a second signal sent by the network device by using a second beam; detecting that a received signal strength of the second signal is greater than or equal to a second preset threshold; and sending first index information to the network device, where the first index information indicates an index number of the second signal.

With reference to the fourth aspect and all the implementations of the fourth aspect, in an implementation, when the request sequence is used at least for requesting data scheduling, the indication message further includes a buffer status report BSR.

With reference to the fourth aspect and all the implementations of the fourth aspect, in an implementation, the processor is further configured to control the transceiver to perform the following operations: if the response message is not received within a preset time, resending the request sequence to the network device; and when a quantity of times of sending the request sequence to the network device reaches a preset maximum quantity of sending times, performing one of the following: initiating a random access process, reporting a beam recovery failure, and reporting a radio link failure.

With reference to the fourth aspect and all the implementations of the fourth aspect, in an implementation, the response message is scrambled by using a radio network temporary identifier RNTI, and the RNTI is obtained by using a preset function and at least one of the following variables: an index number of the request sequence, an index number of a time resource for sending the request sequence, and an index number of a frequency resource for sending the request sequence.

With reference to the fourth aspect and all the implementations of the fourth aspect, in an implementation, the indication message is carried by at least one media access control control element MAC CE.

According to a fifth aspect, an embodiment of this application provides a method for sending a beam recovery request, including: sending a request sequence to a network device; receiving a response message sent by the network device, where the response message indicates that the network device responds to the request sequence; and sending an indication message to the network device, where the indication message indicates that the request sequence is used for at least one of the following: requesting beam recovery, requesting data scheduling, and requesting beam adjustment. In this embodiment of this application, the request sequence sent by the terminal device to the network device is not necessarily used for requesting beam recovery, but may be reused for requesting beam adjustment and/or requesting data scheduling.

Another aspect of embodiments of this application provides a computer program product that includes an instruction. When the instruction runs on a computer, the computer is enabled to perform the method in the foregoing aspects.

Still another aspect of the embodiments of this application provides a communications chip that stores an instruction. When the instruction runs on a network device or a terminal device, the network device or the terminal device is enabled to perform the method in the foregoing aspects.

Yet another aspect of the embodiments of this application provides a computer readable storage medium. The computer readable storage medium stores an instruction. When the instruction runs on a computer, the computer is enabled to perform the method in the foregoing aspects.

DESCRIPTION OF EMBODIMENTS

Figure 1:
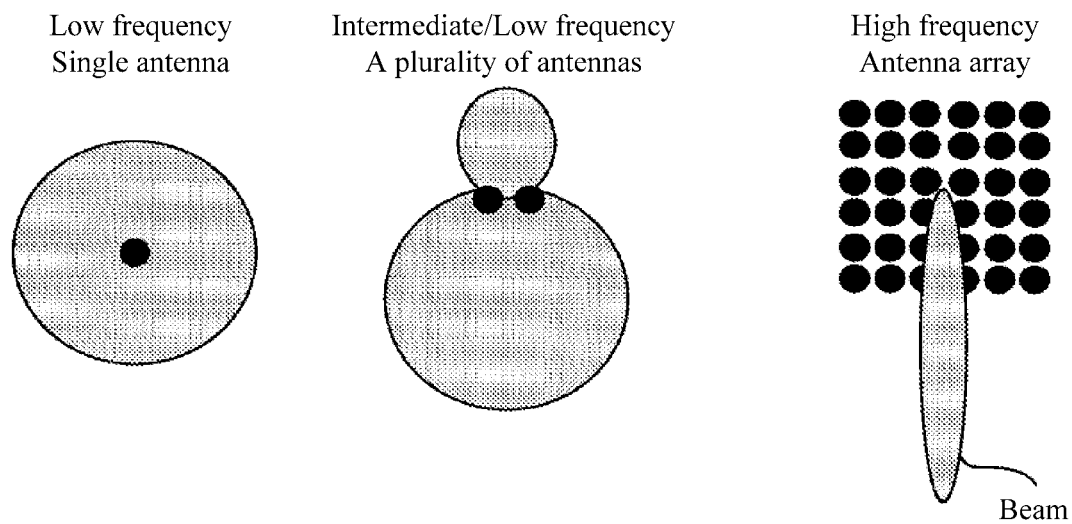
FIG. 1 is a schematic diagram of sending signals.

For ease of understanding, before embodiments of this application are described, related technologies and related terms in the embodiments of this application are first introduced briefly.

Beamforming (beamforming): Beamforming may also be referred to as spatial filtering, and is a signal processing technology in which signals are directionally sent and received by using an antenna array. In beamforming, a beamforming weight of an antenna array is set, so that signals at some angles are constructively interfered and signals at other angles are destructively interfered. Beamforming can be used for sending a signal at a transmit end, and can also be used for receiving a signal at a receive end.

Transmit beamforming: When a transmit end with an antenna array sends a signal, a specific amplitude and phase are set on each antenna element in the antenna array, so that the sent signal has a specific spatial directivity, to be specific, signal power in some directions is high, signal power in some directions is low, and a direction with highest signal power is a direction of a transmit beam. The antenna array includes a plurality of antenna elements. The additional specific amplitude and phase are a beamforming weight.

Transmit beam: A transmit beam is a beam that has a spatial directivity and that is formed by a signal sent by a transmit end by using a specific beamforming weight.

Receive beamforming: When a receive end with an antenna array receives a signal, a specific amplitude and phase are set on each antenna element in the antenna array, so that a power gain of the received signal has a directivity, to be specific, power gains of signals received in some directions are high, power gains of signals received in some directions are low, and a direction with a highest power gain in signal reception is a direction of a receive beam. The antenna array includes a plurality of antenna elements. The additional specific amplitude and phase are a beamforming weight.

Receive beam: A receive beam is a beam that has a spatial directivity and that is formed by a signal received by a receive end by using a specific beamforming weight.

Sending a signal by using a transmit beam means sending the signal by using a beamforming weight.

Receiving a signal by using a receive beam means receiving the signal by using a beamforming weight.

Beam pair (beam pair): One beam pair includes one transmit beam and one receive beam. Beam pairs may be further classified into an uplink beam pair and a downlink beam pair. The downlink beam pair refers to a transmit beam of a network device and a receive beam of a terminal device. The uplink beam pair refers to a transmit beam of a terminal device and a receive beam of a network device.

Beam alignment: A transmit end sends signals to a receive end by using different transmit beams. The receive end receives, by using a specific receive beam, the signals sent by the transmit end, and measures signal gains of the received signals. When a signal gain of a signal sent by using one of the transmit beams is greater than a preset threshold, beam alignment is implemented between the transmit beam and the specific receive beam that is used by the receive end, in other words, the transmit beam is aligned with the specific receive beam used by the receive end.

Beam correspondence (beam correspondence): A transmit beam and a receive beam between which beam alignment is implemented have a beam correspondence. To be specific, it is assumed that in downlink communication, a transmit beam of a network device is a beam A, a receive beam of a terminal device is a beam B, and the beam A is aligned with and the beam B; in this case, in uplink communication, the terminal device uses the beam B as a transmit beam, and the network device uses the beam A as a receive beam. A beam correspondence can also indicate that the beam B is aligned with the beam A.

The following describes application scenarios and devices of technical solutions in the embodiments of this application with reference to accompanying drawings.

Figure 2:
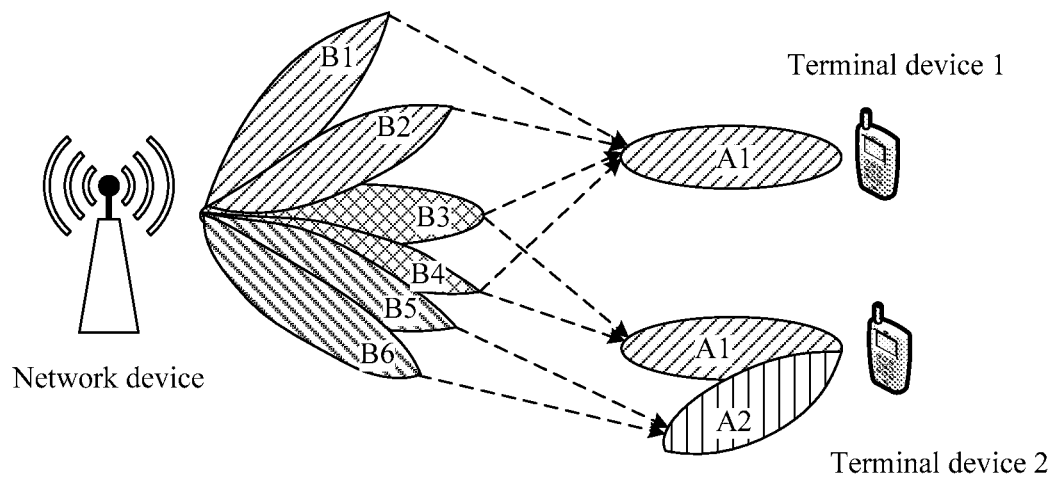
FIG. 2 is a schematic diagram of an application scenario of a technical solution according to an embodiment of this application.

FIG. 2 is a schematic diagram of an application scenario of a technical solution according to an embodiment of this application. As shown in FIG. 2, a network device has six different transmit beams B1 to B6 on a radio frequency channel, and uses different transmit beamforming for the six beams. As a receive end of the radio frequency channel, a terminal device 1 has one beam A1. As a receive end of the radio frequency channel, a terminal device 2 has two beams: A1 and A2. Beam pair information is established between the network device and the terminal device 1 by using B1 to B4 and A1, for communication between the network device and the terminal device 1. Beam pair information is established between the network device and the terminal device 2 by using B3 to B6, A1 and A2, for communication between the network device and the terminal device 2. It should be understood that this application is applied to any beamforming-based communication between a network device and a terminal device. FIG. 2 only shows a scenario in which the network device serves as a transmit end and the terminal device serves as the receive end in downlink communication. However, in uplink communication, the terminal device may also serve as a transmit end, and the network device serves as a receive end.

The network device may be a device capable of communicating with the terminal device. The network device may be a base station, a relay station, an access point, or the like. The base station may be a base transceiver station (base transceiver station, BTS for short) in a global system for mobile communications (global system for mobile communications, GSM for short) or code division multiple access (code division multiple access, CDMA for short) network; may be an NB (NodeB) in wideband code division multiple access (wideband code division multiple access, WCDMA for short); or may be an eNB or eNodeB (evolved NodeB) in LTE. The network device may be alternatively a radio controller in a cloud radio access network (cloud radio access network, CRAN for short) scenario. The network device may be alternatively a network device in a future 5G network or a network device in a future evolved PLMN, or may be a wearable device, a vehicle-mounted device, or the like.

The terminal device 1 or the terminal device 2 may be UE, an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (session initiation protocol, SIP for short) phone, a wireless local loop (wireless local loop, WLL for short) station, a personal digital assistant (personal digital assistant, PDA for short), a handheld device having a wireless communication function, a computing device, another processing device connected to a wireless modem, a vehicle-mounted device, a wearable device, a terminal device in the future 5G network, a terminal device in the future evolved PLMN network, or the like.

It should be noted that this specification provides descriptions by using examples in which a network device 100 is a base station and a terminal device 200 is UE.

Figure 3:
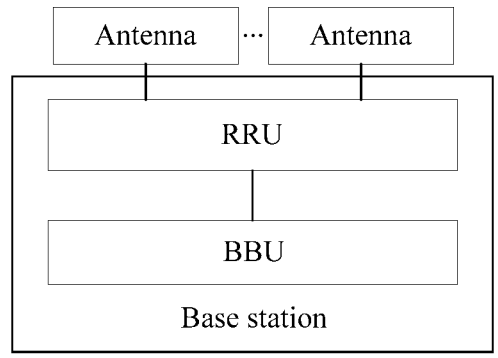
FIG. 3 is a schematic diagram of a general hardware architecture of a base station according to an embodiment of this application.

An example in which the network device 100 is the base station is used to describe a general hardware architecture of the base station. FIG. 3 is a schematic diagram of a general hardware architecture of a base station according to an embodiment of this application. As shown in FIG. 3, the base station may include a building baseband unit (building baseband unit, BBU for short) and a remote radio unit (remote radio unit, RRU for short). The RRU is connected to at least one antenna system (namely, an antenna). The BBU and the RRU may be separated for use, depending on a requirement.

Figure 4:
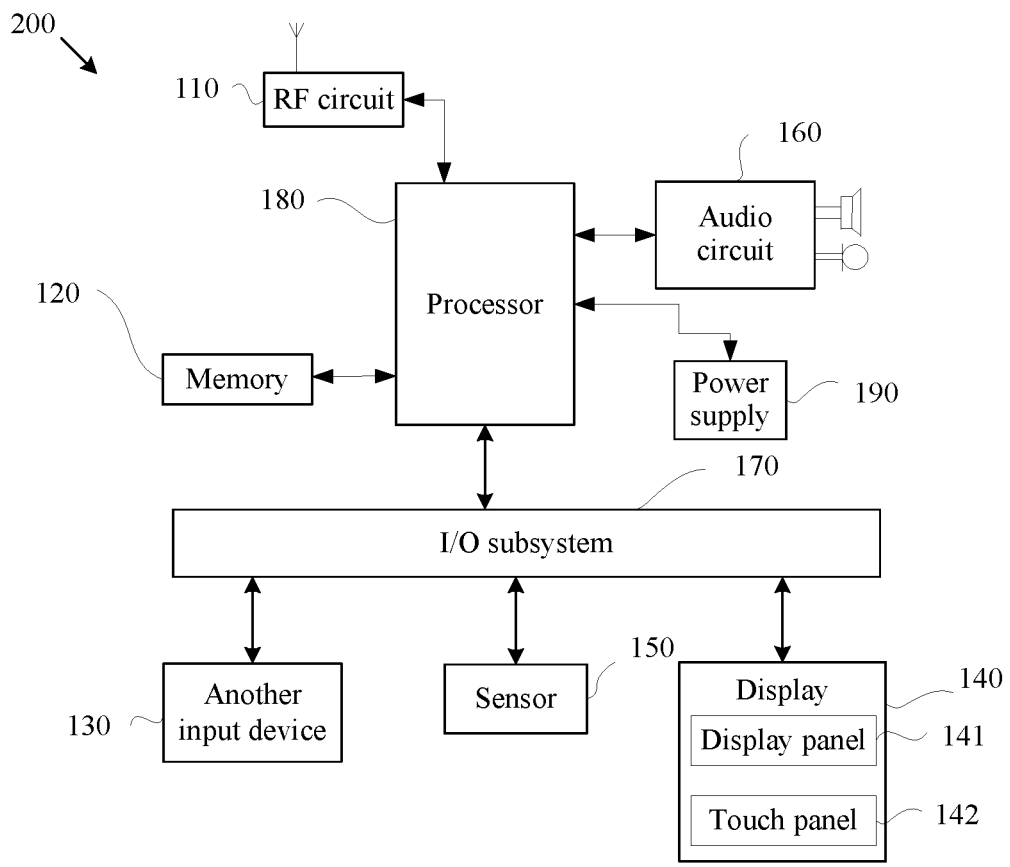
FIG. 4 is a schematic diagram of a general hardware architecture of a mobile phone according to an embodiment of this application.

An example in which the terminal device 200 is a mobile phone is used to describe a general hardware architecture of the mobile phone. FIG. 4 is a schematic diagram of a general hardware architecture of a mobile phone according to an embodiment of this application. As shown in FIG. 4, the mobile phone may include components such as a radio frequency (Radio Frequency, RF) circuit 110, a memory 120, another input device 130, a display 140, a sensor 150, an audio circuit 160, an I/O subsystem 170, a processor 180, and a power supply 190. A person skilled in the art can understand that a structure of the mobile phone shown in FIG. 4 does not constitute any limitation on the mobile phone. The mobile phone may include more or fewer components than those shown in the figure, or some components may be combined, or some components may be split, or the components may be disposed differently. A person skilled in the art can understand that the display 140 belongs to a user interface (user Interface, UI) and the display 140 may include a display panel 141 and a touch panel 142. Although not shown, the mobile phone may further include function modules or components such as a camera and a Bluetooth module. Details are not described herein.

Further, the processor 180 is connected to each of the RF circuit 110, the memory 120, the audio circuit 160, the I/O subsystem 170, and the power supply 190. The I/O subsystem 170 is connected to each of the another input device 130, the display 140, and the sensor 150. The RF circuit 110 may be configured to receive and send a signal in receiving a message and sending a message or during a call. In particular, after receiving downlink information of a base station, the RF circuit 110 transfers the downlink information to the processor 180 for processing. The memory 120 may be configured to store program code that includes a computer operation instruction. The processor 180 performs various function applications and data processing of the mobile phone by running the program code stored in the memory 120. The another input device 130 may be configured to receive input digital or character information, and generate a key signal input related to user settings and function control of the mobile phone. The display 140 may be configured to display information input by a user or information provided to a user, and various mobile phone menus, and may further accept user input. The sensor 150 may be a light sensor, a motion sensor, or another sensor. The audio circuit 160 may provide an audio interface between the user and the mobile phone. The I/O subsystem 170 is configured to control an input/output external device, and the external device may include another device input controller, a sensor controller, and a display controller. The processor 180 is a control center of the mobile phone 200, is connected to all parts of the entire mobile phone by using various interfaces and lines, and performs various functions of the mobile phone 200 and processes data by running or executing the program code stored in the memory 120 and by invoking data stored in the memory 120, to perform overall monitoring on the mobile phone. The power supply 190 (such as a battery) is configured to supply power to the foregoing components. Preferably, the power supply may be logically connected to the processor 180 by using a power management system, to implement functions such as charge management, discharge management, and power consumption management by using the power management system.

The following describes the technical solutions in the embodiments of this application with reference to the accompanying drawings.

Figure 5:
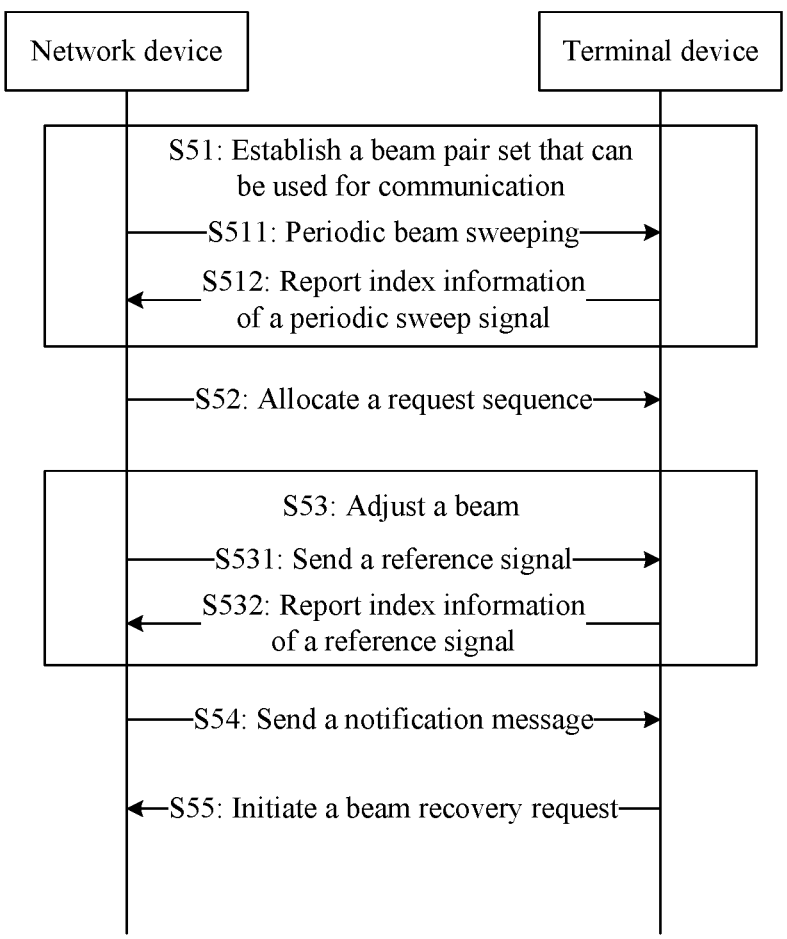
FIG. 5 is a schematic flowchart of a method for communication between a network device and a terminal device by using a beam pair according to an embodiment of this application.

FIG. 5 is a schematic flowchart of a method for communication between a network device and a terminal device by using a beam pair according to an embodiment of this application. As shown in FIG. 5, the method includes the following steps.

S51: The network device and the terminal device establish a beam pair set that can be used for communication.

The network device and the terminal device may establish the beam pair set by performing the following steps.

S511: The network device performs periodic beam sweeping.

Figure 6:
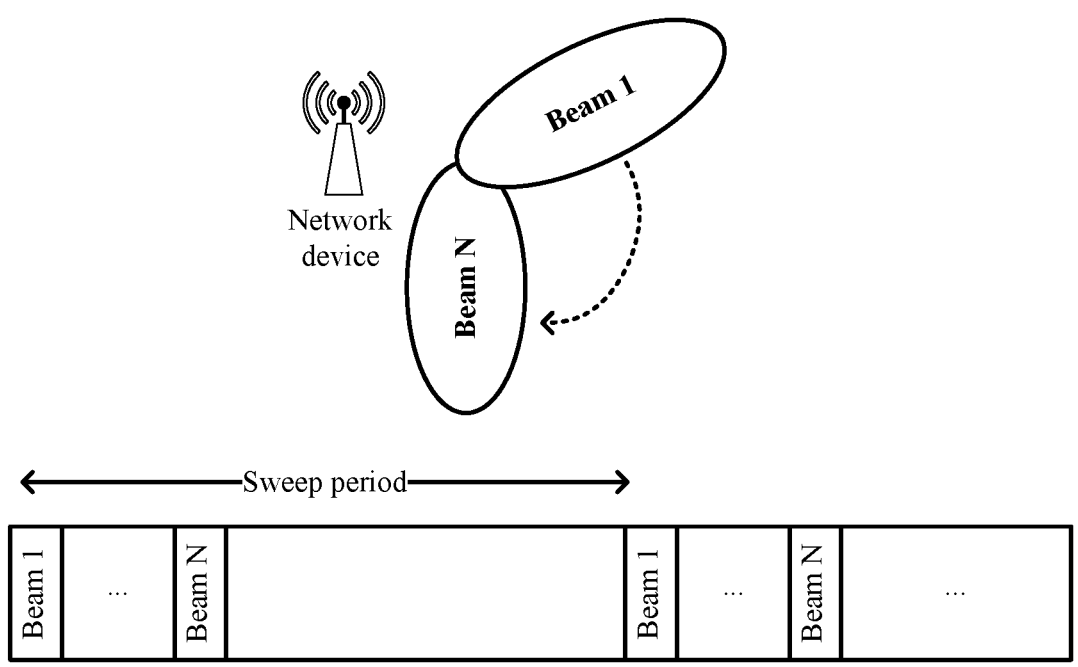
FIG. 6 is a schematic diagram of periodic beam sweeping performed by a network device.

FIG. 6 is a schematic diagram of periodic beam sweeping performed by the network device. As shown in FIG. 6, that the network device performs periodic beam sweeping means that the network device periodically sends N periodic sweep signals respectively by using N transmit beams (referred to as periodic sweep beams below). Types of periodic sweep signals may include a synchronization signal block (synchronization signal block, SS Block for short) and a channel state information-reference signal (channel state information-reference signal, CSI-RS for short), and N is a positive integer. The network device may alternatively send periodic sweep signals in a different sweep period by using a different quantity of periodic sweep beams.

The N periodic sweep signals are in one-to-one correspondence with the N periodic sweep beams, and each of the N periodic sweep signals has an index number. Both the network device and the terminal device can determine, based on an index number of a periodic sweep signal, a periodic sweep beam corresponding to the periodic sweep signal. An index number of a periodic sweep signal is an index number of a periodic sweep beam corresponding to the periodic sweep signal. For example, the network device respectively sends, by using periodic sweep beams whose numbers are 1 to 10, periodic sweep signals whose index numbers are 1 to 10. In this case, the terminal device can determine, based on a periodic sweep signal whose index number is 5, a periodic sweep beam whose number is 5.

An index number of an SS block may be a natural code (for example, a positive integer such as 1, 2, or 3), or may be represented by using at least one of the following: a frame index number, a subframe index number, a slot index number, and an OFDM symbol index number. An index number of a CSI-RS may be a natural code, or may be represented by using at least one of the following: a frame index number, a subframe index number, a slot index number, an OFDM symbol index number, a CSI-RS resource index number, and a CSI-RS port index number.

S512: The terminal device reports index information of a periodic sweep signal to the network device.

When the network device performs beam sweeping, the terminal device receives, by using at least one receive beam, periodic sweep signals sent by the network device, and measures received signal strengths, for example, reference signal received power (reference signal received power, RSRP for short), of these periodic sweep signals. When detecting that a received signal strength of a periodic sweep signal is greater than or equal to a preset threshold, the terminal device reports an index number of the periodic sweep signal to the network device, and records a receive beam that is used by the terminal device to receive the periodic sweep signal. The receive beam and a periodic sweep beam that corresponds to the reported periodic sweep signal form a beam pair that can be used for communication. The index information, of the periodic sweep signal, reported by the terminal device to the network device may include index numbers of a plurality of periodic sweep signals.

For example, it is assumed that the network device in FIG. 2 sends four periodic sweep signals to the terminal device 1 in a sweep period by using the transmit beams B1 to B4. Index numbers of the four periodic sweep signals are 1, 2, 3, and 4. The terminal device uses the receive beam A1 to receive the four periodic sweep signals. In addition, when the terminal device detects that received signal strengths of a periodic sweep signal 2 and a periodic sweep signal 3 are greater than or equal to a preset threshold, the terminal device reports the periodic sweep signal 2 and the periodic sweep signal 3 to the network device, and records the receive beam A1. In this case, the network device and the terminal device establish a beam pair set that can be used for communication and that includes a beam pair B2 and A1 and a beam pair B3 and A1.

S52: The network device allocates, to the terminal device, a request sequence used to indicate a beam recovery request.

This step may take place at any moment before the terminal device initiates the beam recovery request. The network device allocates a UE-specific (UE-Specific) request sequence to the terminal device. Request sequences of different terminal devices are orthogonal. The network device can learn, based on a received request sequence, which terminal device initiates the beam recovery request. Alternatively, the network device allocates a request sequence to the terminal device, and further allocates a UE-specific time-frequency resource to the terminal device. The request sequence may not be specific to the terminal device. A plurality of terminal devices may share one request sequence. The network device learns, based on the time-frequency resource on which the request sequence is received, which terminal device initiates the beam recovery request. Alternatively, the network device may allocate a UE-specific request sequence and a UE-specific time-frequency resource to the terminal device.

S53: The network device and the terminal device perform beam adjustment.

After the beam pair set that can be used for communication is established, the network device may dynamically select some beam pairs in the beam pair set as serving beam pairs, and use other beam pairs as alternative beam pairs. The serving beam pair is a beam pair that is currently used for control signal transmission or data signal transmission between the network device and the terminal device. The alternative beam pair is a beam pair that is currently not used for control signal transmission or data signal transmission.

After establishing the beam pair set that can be used for communication, the network device and the terminal device adjust at least one beam pair (including a serving beam pair and an alternative beam pair) in the beam pair set, to track a channel change caused by movement or rotation of the terminal device or caused by an environment change. Beam adjustment may be initiated by the network device, or may be initiated by the terminal device proactively. This is not limited in this embodiment of this application.

The network device and the terminal device may perform beam adjustment by performing the following steps:

S531: The network device sends K reference signals respectively by using K periodic sweep beams.

The network device sends the K reference signals respectively by using the K periodic sweep beams around a periodic sweep beam (referred to as a target beam below) in a specific beam pair in the beam pair set. The K periodic sweep beams are a subset of the N periodic sweep beams in S511, K is a positive integer, and K≤N. However, usually, K is smaller than N to reduce a quantity of reference signals. K<N is used as an example for description in this embodiment of this application. A reference signal is, for example but not limited to, a CSI-RS. The K reference signals are different from the N periodic sweep signals in S511. Each of the K reference signals has an index number, but the index number is different from an index number of a periodic sweep beam. The terminal device cannot determine a periodic sweep beam based on an index number of any one of the K reference signals. It should be noted that the network device indicates, to the terminal device, a target beam for adjustment.

S532: The terminal device reports index information of a reference signal to the network device.

The terminal device receives, by using at least one receive beam, the reference signals sent by the network device, and measures received signal strengths of these reference signals. When detecting that a received signal strength of a reference signal is greater than or equal to a preset threshold, the terminal device reports an index number of the reference signal to the network device, and records a receive beam that is used by the terminal device to receive the reference signal. The receive beam and a periodic sweep beam that corresponds to the reported reference signal form a new beam pair, and a target beam pair in the beam pair set is adjusted to be the new beam pair.

Figure 7:
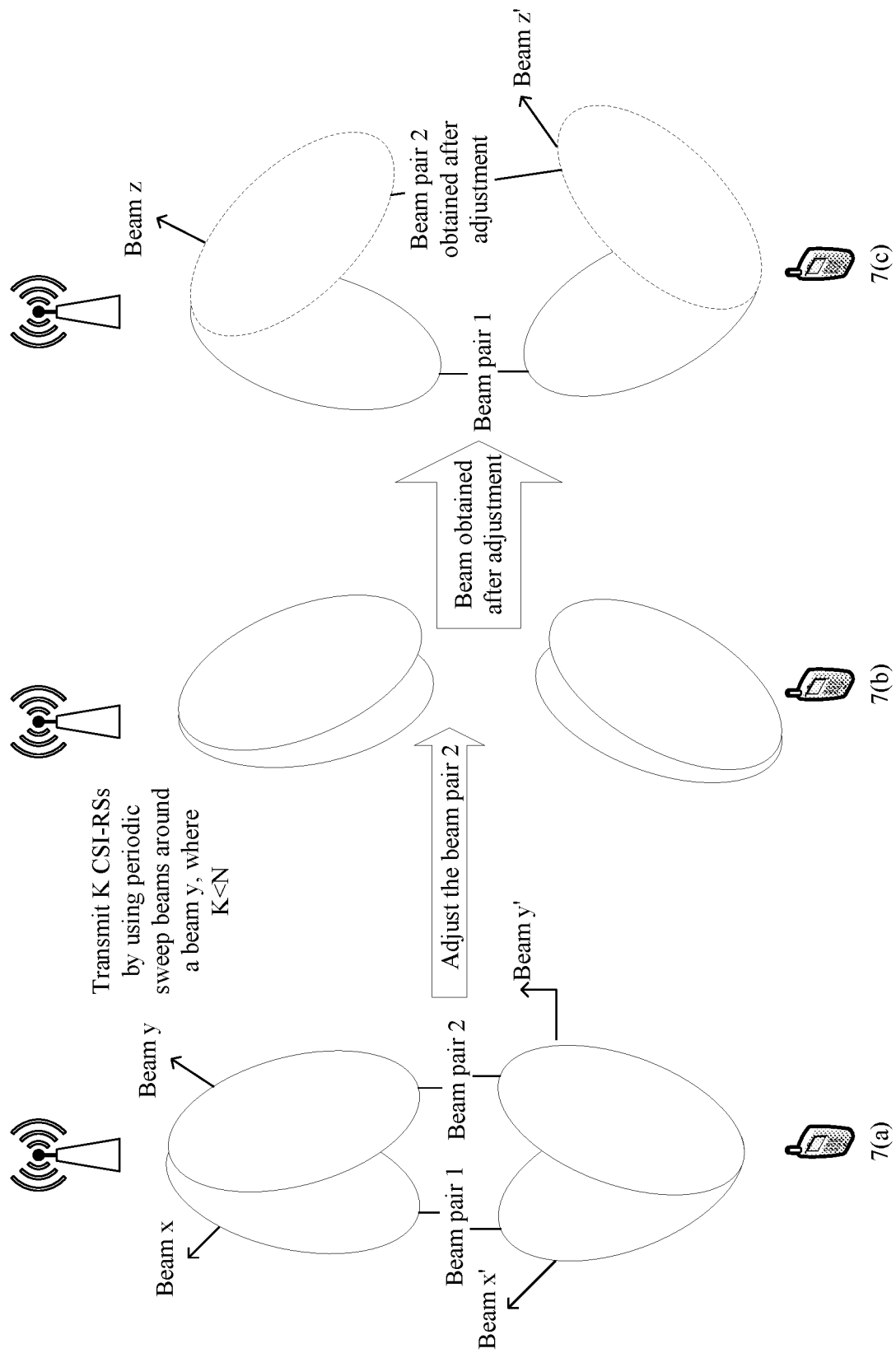
FIG. 7 is a schematic diagram of beam adjustment according to an embodiment of this application.

FIG. 7 is a schematic diagram of beam adjustment according to an embodiment of this application. As shown in FIG. 7, a beam pair set that can be used for communication and that is established by the network device and the terminal device includes a beam pair 1 and a beam pair 2 (as shown in FIG. 7(a)). The beam pair 1 includes a beam x on a network device side and a beam x' on a terminal device side. The beam pair 2 includes a beam y on the network device side and a beam y' on the terminal device side. The beams x and y on the network device side are both periodic sweep beams. When the beam pair 2 is to be adjusted, the network device may send K CSI-RSs respectively by using K periodic sweep beams around the beam y on the network device side (as shown in FIG. 7(b)). Finally, the beam pair 2 is adjusted from the original beam pair shown in FIG. 7(a) to a beam pair represented by dashed lines shown in FIG. 7(c) (as shown in FIG. 7(c)). The beam pair 2 obtained after adjustment includes a beam z on the network device side and a beam z' on the terminal device side.

S54: The network device sends a notification message to the terminal device.

When the terminal device moves or rotates or an environment changes, the serving beam pair may be blocked, leading to a failure. When the terminal device detects that a received signal strength of a downlink signal is less than a preset threshold, the terminal device detects a beam failure. When detecting the beam failure, the terminal device initiates the beam recovery request. The terminal device initiates the beam recovery request by sending, to the network device, the request sequence allocated by the network device in S52. The terminal device uses a downlink receive beam in a beam pair in the current beam pair set as an uplink transmit beam to send the request sequence.

Figure 8:
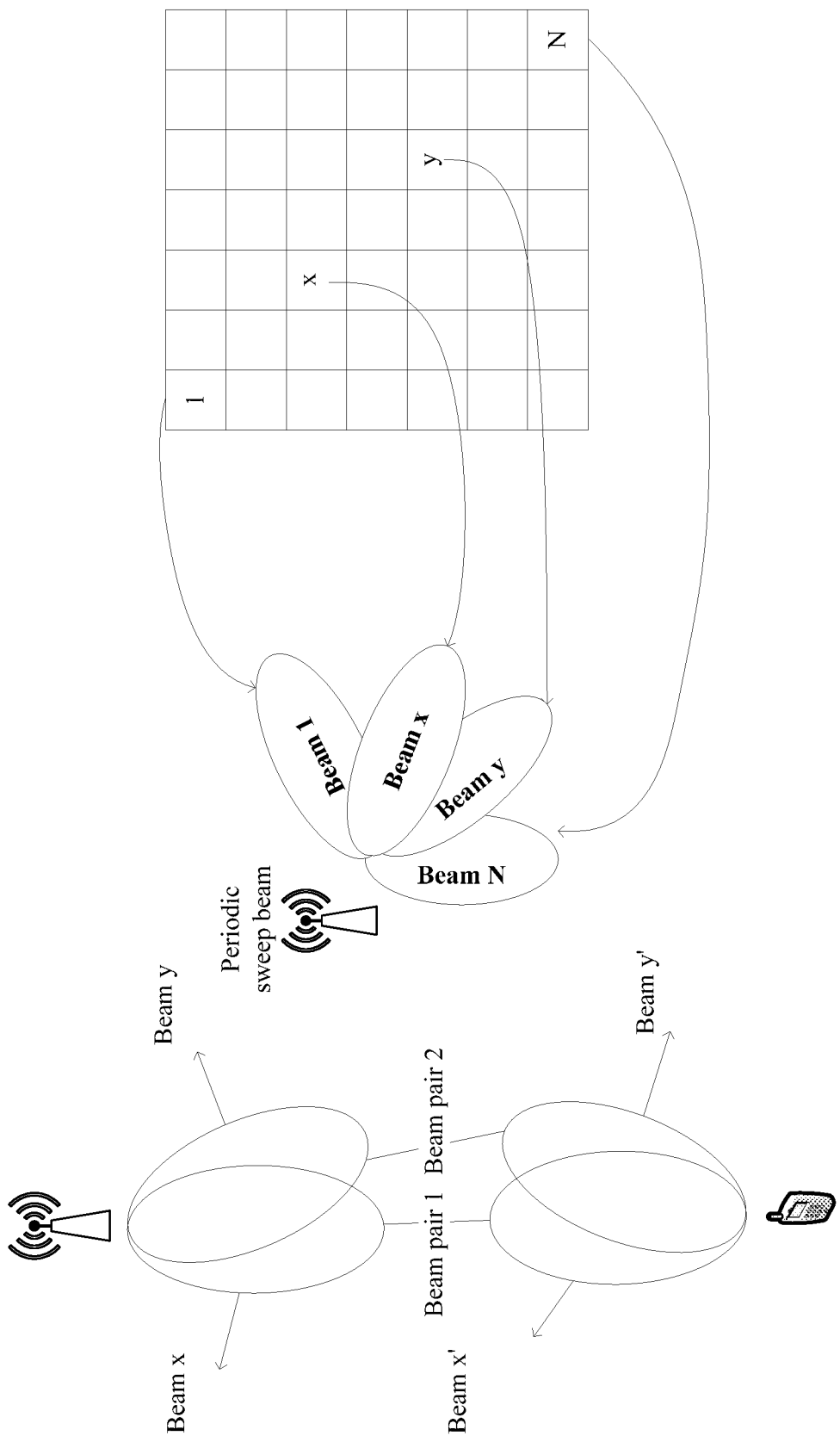
FIG. 8 is a schematic diagram of sending a request sequence on a time-frequency resource without beam adjustment according to an embodiment of this application.

FIG. 8 is a schematic diagram of sending a request sequence on a time-frequency resource without beam adjustment according to an embodiment of this application. As shown in FIG. 8, a beam pair set that can be used for communication and that is established by the network device and the terminal device includes a beam pair 1 and a beam pair 2. The beam pair 1 includes a beam x on the network device side and a beam x' on the terminal device side. The beam pair 2 includes a beam y on the network device side and a beam y' on the terminal device side. The beams x and y on the network device side are both periodic sweep beams. The beam pair 1 is a serving beam pair, and the beam pair 2 is an alternative beam pair. When detecting a beam failure, the terminal device may send the request sequence to the network device by using the beam x' or y'. Correspondingly, the network device receives, by using the periodic sweep beam x or y, the request sequence sent by the terminal device. Because the network device needs to learn, in a timely manner, whether each terminal device initiates a beam recovery request, the network device uses different periodic sweep beams as receive beams to perform detection on different time-frequency resources. There is a correspondence between a time-frequency resource used by the terminal device to send the request sequence and a periodic sweep beam (in other words, there is a correspondence between the time-frequency resource used by the terminal device to send the request sequence and a periodic sweep signal). As shown in FIG. 8, a periodic sweep beam 1 corresponds to a time-frequency resource 1, the periodic sweep beam x corresponds to a time-frequency resource x, the periodic sweep beam y corresponds to a time-frequency resource y, and a periodic sweep beam N corresponds to a time-frequency resource N. It should be noted that each of the time-frequency resources 1, x, y, and N may include one resource element (resource element, RE for short) or a plurality of REs.

The terminal device needs to transmit the request sequence on a correct time-frequency resource. FIG. 8 is still used as an example. It is assumed that a transmit beam used by the terminal to send the request sequence is the beam x'. The beam x' on the terminal side is aligned with the beam x on the network device side. The network device performs reception on the time-frequency resource x by using the beam x. Therefore, the network device can detect the request sequence only when the terminal device sends the request sequence on the time-frequency resource x. If the terminal device sends the request sequence on a wrong time-frequency resource, for example, the terminal device sends the request sequence on the time-frequency resource y, a beam used by the network device to receive the request sequence on the time-frequency resource y is the beam y. However, the beam y is not aligned with the transmit beam x' of the terminal device. As a result, the network device cannot receive the request sequence sent by the terminal device. Likewise, if the terminal sends the request sequence by using the beam y', the request sequence should be sent on the time-frequency resource y.

Figure 9:
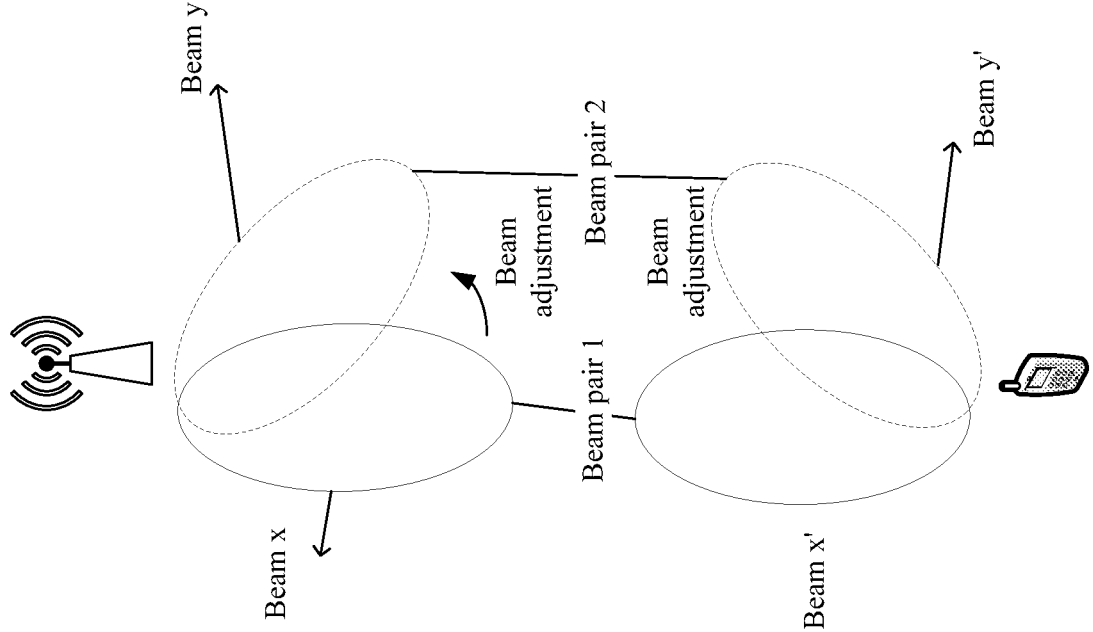
FIG. 9 is a schematic diagram of sending a request sequence on a time-frequency resource after beam adjustment according to an embodiment of this application.

FIG. 9 is a schematic diagram of sending a request sequence on a time-frequency resource after beam adjustment according to an embodiment of this application. As shown in FIG. 9, a beam pair set established by the network device and the terminal device includes a beam pair 1. The beam pair 1 includes a beam x on the network device side and a beam x' on the terminal device side. It is assumed that after beam adjustment, the beam pair 1 is adjusted to be a beam pair 2. The beam pair 2 includes a beam y on the network device side and a beam y' on the terminal device side. In this case, if the terminal device is to initiate a beam recovery request on the beam y', according to the foregoing descriptions, the terminal device needs to send the request sequence on a time-frequency resource y corresponding to the beam y. However, as described in S531, the terminal device does not know an index number of the beam y aligned with the beam y', and therefore does not know which time-frequency resource should be used for sending the request sequence.

Therefore, the network device needs to send the notification message to the terminal device. The notification message includes index numbers of all periodic sweep beams in a current beam pair set, that is, index numbers of periodic sweep signals sent by the network device by using all the periodic sweep beams in the current beam pair set when the network device performs periodic beam sweeping. The notification message may be sent periodically. After receiving the notification message, the terminal device can determine an index number of a periodic sweep beam aligned with a beam used to initiate the beam recovery request, and further determine a time-frequency resource corresponding to the periodic sweep beam, so as to send the request sequence on the correct time-frequency resource. In this way, the network device can correctly receive the beam recovery request initiated by the terminal device. For example, the current beam pair set includes the beam pair 1 and the beam pair 2. The beam pair 1 includes the beam x on the network device side and the beam x' on the terminal device side. The beam pair 2 includes the beam y on the network device side and the beam y' on the terminal device side. The beams x and y on the network device side are both periodic sweep beams. In this case, the notification message includes index numbers of the beam x and the beam y.

Alternatively, the notification message includes index numbers of all periodic sweep beams obtained after adjustment in a current beam pair set, and an index number of an unadjusted periodic sweep beam in the current beam pair set is not sent to the terminal device. Compared with sending index numbers of all periodic sweep beams, this can save downlink signaling resources. For example, the current beam pair set includes the beam pair 1 and the beam pair 2. The beam pair 1 includes the beam x on the network device side and the beam x' on the terminal device side. The beam pair 2 includes the beam y on the network device side and the beam y' on the terminal device side. The beams x and y on the network device side are both periodic sweep beams. In addition, the beam pair 2 is obtained by adjusting a beam pair 3. The beam pair 3 includes a beam z on the network device side and a beam z' on the terminal device side. The beam pair 1 is unadjusted (to be specific, before previous beam adjustment, a beam pair set between the network device and the terminal device includes the beam pair 1 and the beam pair 3). In this case, the notification message includes only an index number of the beam y.

Alternatively, the notification message includes a difference between an index number of each periodic sweep beam in a current beam pair set and an index number of a corresponding periodic sweep beam in a notification message sent last time. For example, the current beam pair set includes the beam pair 1 and the beam pair 2. The beam pair 1 includes the beam x on the network device side and the beam x' on the terminal device side. The beam pair 2 includes the beam y on the network device side and the beam y' on the terminal device side. The beams x and y on the network device side are both periodic sweep beams. In addition, the beam pair 2 is obtained by adjusting a beam pair 3. The beam pair 3 includes a beam z on the network device side and a beam z' on the terminal device side. The beam pair 1 is unadjusted, and the notification message sent last time includes index numbers of the beam x and the beam z. In this case, the notification message includes a difference between index numbers of the beam x and the beam y and a difference between index numbers of the beam y and the beam z.

Alternatively, the notification message includes a difference between an index number of each periodic sweep beam obtained after adjustment in a current beam pair set and an index number of an unadjusted periodic sweep beam in a notification message sent last time. Referring to the foregoing example, in this case, the notification message includes only a difference between index numbers of the beam y and the beam z.

Alternatively, the notification message includes indication information, and the indication information is used to indicate that each periodic sweep beam or each periodic sweep beam obtained after adjustment in a current beam pair set is quasi co-located (quasi co-located, QCL for short), in regard to a parameter, in a reference signal sent during beam adjustment and one of the N periodic sweep signals. The parameter may include one of the following: an average gain, an average latency, delay spread, a Doppler shift, Doppler spread, channel relevancy, a receive beam, or an angle of arrival. For example, the current beam pair set includes the beam pair 1 and the beam pair 2. The beam pair 1 includes the beam x on the network device side and the beam x' on the terminal device side. The beam pair 2 includes the beam y on the network device side and the beam y' on the terminal device side. The beams x and y on the network device side are both periodic sweep beams. In addition, the beam pair 2 is obtained by adjusting a beam pair 3. The beam pair 3 includes a beam z on the network device side and a beam z' on the terminal device side. The beam pair 1 is unadjusted. In this case, the indication information may indicate that the beam y is quasi co-located, in regard to a parameter, in a reference signal sent during beam adjustment and one of the N periodic sweep signals.

S55: The terminal device initiates the beam recovery request.

After receiving the notification message sent by the network device, the terminal device sends the request sequence on the correct time-frequency resource.

In this embodiment of this application, after beam adjustment, the network device sends the notification message to the terminal device, to notify the terminal device of an index number of a periodic sweep beam obtained after adjustment. After receiving the notification message, the terminal device can determine an index number of a periodic sweep beam aligned with a beam used to initiate the beam recovery request, and further determine a time-frequency resource corresponding to the periodic sweep beam, so as to send the request sequence on the correct time-frequency resource. In this way, the network device can correctly receive the beam recovery request initiated by the terminal device.

In this embodiment of this application, after the beam pair set that can be used for communication is established in S51, to provide a high signal gain for improving a data transmission rate, the network device and the terminal device may establish a plurality of second-level beam pairs based on a first-level beam pair included in the beam pair set (referred to as a first-level beam pair set below), to establish a second-level beam pair set that can be used for communication. A beam in the first-level beam pair is a wide beam, and a beam in the second-level beam pair is a narrow beam. If a narrow beam is established based on a wide beam, a receive/transmit angle of the narrow beam is within a range of a receive/transmit angle of the wide beam. For example, the receive/transmit angle of the wide beam is 20 degrees to 40 degrees. If four narrow beams are established based on the wide beam, receive/transmit angles corresponding to the four narrow beams may be 20 degrees to 25 degrees, 25 degrees to 30 degrees, 30 degrees to 35 degrees, and 35 degrees to 40 degrees. When a range of a receive/transmit angle of a second-level beam on the network device side is within a range of a receive/transmit angle of a first-level beam (namely, a periodic sweep beam) on the network device side, there is a correspondence between the second-level beam and the periodic sweep beam on the network device side. In this case, there is also a correspondence between a second-level beam pair formed by the second-level beam on the network device side and a second-level beam on the terminal device side aligned with the second-level beam on the network device side, and a correspondence between a first-level beam pair formed by the periodic sweep beam and a first-level beam on the terminal device side aligned with the periodic sweep beam.

After the second-level beam pair set that can be used for communication is established, the network device and the terminal device adjust at least one second-level beam pair in the second-level beam pair set. Specifically, the network device sends the K reference signals respectively by using K second-level beams around a network device-side beam (referred to as a second-level target beam below) in a specific second-level beam pair (referred to as a second-level target beam pair below) in the second-level beam pair set. Then, the terminal device feeds back an index number of a selected reference signal, and records a receive beam that is used by the terminal device to receive the reference signal. The receive beam and a network device-side beam that corresponds to the reported reference signal form a new second-level beam pair, and the second-level target beam pair in the second-level beam pair set is also adjusted to be the new second-level beam pair.

It should be noted that the new second-level beam pair may deviate from a first-level beam pair corresponding to the second-level target beam pair. To be specific, a range of a receive/transmit angle of a second-level beam on the network device side in the new second beam pair is not within a range of a receive/transmit angle of a periodic beam in the first-level beam pair corresponding to the second-level target beam pair. For example, it is assumed that the first-level beam pair set includes a first-level beam pair 1. The first-level beam pair 1 includes a first-level beam x on the network device side and a first-level beam x' on the terminal device side. The first-level beam x on the network device side is a periodic sweep beam. Based on the first-level beam pair 1, a second-level beam pair 2 is established. The second-level beam pair 2 includes a second-level beam x1 on the network device side and a second-level beam x1' on the terminal device side. In this case, there is a correspondence between the second-level beam x1 and the periodic sweep beam x, and there is also a correspondence between the second-level beam pair 2 and the first-level beam pair 1. During beam adjustment, the second-level beam pair 2 is adjusted to be a second-level beam pair 3. The second-level beam pair 3 includes a second-level beam y1 on the network device side and a second-level beam y1' on the terminal device side. The second-level beam pair 3 does not correspond to the first-level beam pair 1, but corresponds to a first-level beam pair 4. In other words, the second-level beam pair 3 deviates from the first-level beam pair 1. The first-level beam pair 4 includes a first-level beam y on the network device side and a first-level beam y' on the terminal device side. The first-level beam y on the network device side is a periodic sweep beam. In this case, if the terminal device sends the request sequence, in consideration of reliability or coverage, the request sequence needs to be sent by using the first-level beam (the beam y') on the terminal side corresponding to the second-level beam (the beam y1') obtained after adjustment on the terminal side. However, in this case, the terminal device does not know an index number of the periodic sweep beam y aligned with the beam y', and therefore does not know which time-frequency resource should be used for sending the request sequence.

Therefore, in this embodiment of this application, if the second-level beam pair set that can be used for communication is established between the network device and the terminal device, after beam adjustment is performed on at least one second-level beam pair in the second-level beam pair set, the network device also needs to send a notification message to the terminal device, to indicate an index number of a periodic sweep beam (s) corresponding to a second-level beam obtained after adjustment or all second-level beams on the network device side in the current second-level beam pair set. For a specific notification manner, refer to related descriptions in S54, and details are not described herein again.

Figure 10:
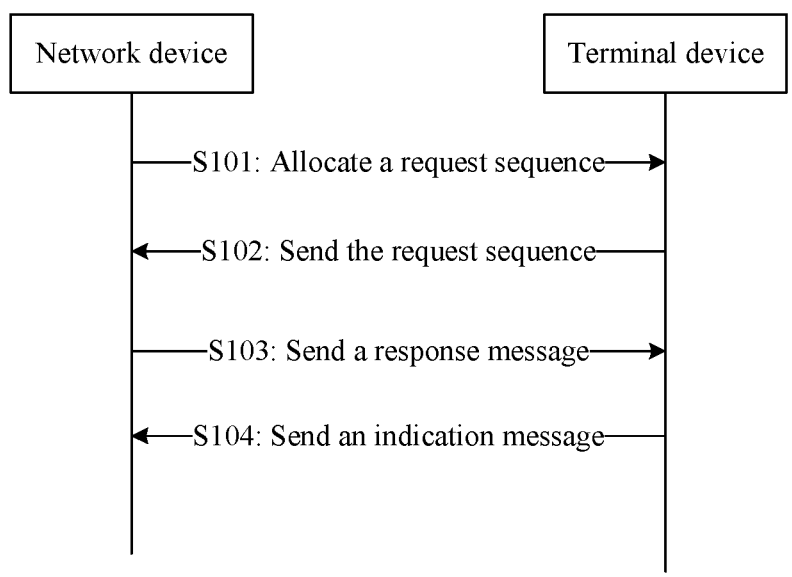
FIG. 10 is a schematic flowchart of a method for sending a message according to an embodiment of this application.

FIG. 10 is a schematic flowchart of a method for sending a message according to an embodiment of this application. As shown in FIG. 10, the method includes the following steps.

S101: A network device allocates a request sequence to a terminal device.

The network device allocates a UE-specific (UE-Specific) request sequence to the terminal device. Request sequences of different terminal devices are orthogonal. The network device can learn, based on the received request sequence, which terminal device sends the request sequence. Alternatively, the network device allocates a UE-specific time-frequency resource to the terminal device, and allocates a request sequence to the terminal device. The request sequence may not be specific to the terminal device. A plurality of terminal devices may share one request sequence. The network device learns, based on the time-frequency resource on which the request sequence is received, which terminal device sends the request sequence. Alternatively, the network device may allocate a UE-specific request sequence and a UE-specific time-frequency resource to the terminal device.

When the network device allocates a UE-specific time-frequency resource (namely, a dedicated time-frequency resource for the terminal device) to the terminal device, the dedicated time-frequency resource may be carried on different channels, such as a physical uplink control channel (physical uplink control channel, PUCCH for short), a physical random access channel (physical random access channel, PRACH for short), and a channel (PRACH-like) whose slot is the same as that of the physical random access channel and whose frequency band is different from that of the physical random access channel.

In this step, the request sequence is not necessarily used to indicate a beam recovery request. In other words, the request sequence is not necessarily used for requesting beam recovery.

S102: The terminal device sends the request sequence to the network device.

S103: The network device sends a response message to the terminal device in response to the received request sequence.

The response message indicates a time-frequency resource that the network device allocates to the terminal device in response to the request sequence. The time-frequency resource is used for subsequent uplink transmission.

Optionally, there is a specific probability that the network device incorrectly determines which terminal device sends the request sequence, and a terminal device that does not send the request sequence also decodes the response message after receiving the response message. To avoid this case, the network device may scramble the response message by using a radio network temporary identifier (radio network temporary identifier, RNTI for short). In this way, once detecting the RNTI after receiving the response message, the terminal device that does not send the request sequence does not decode the response message. The RNTI may be obtained by using a preset function and at least one of the following variables: an index number of the request sequence, an index number of a time resource for sending the request sequence, and an index number of a frequency resource for sending the request sequence.

S104: The terminal device sends an indication message to the network device.

When receiving the response message sent by the network device, the terminal device sends the indication message to the network device on the time-frequency resource indicated in the response message. The indication message indicates an actual function or purpose of the request sequence sent by the terminal device in S102. For example, the request sequence is the beam recovery request, a data scheduling request, or a beam adjustment request. Alternatively, the request sequence may be reused for at least two of a beam recovery request, a data scheduling request, and a beam adjustment request. The beam recovery request means: When the terminal device moves or rotates or an environment changes, a serving beam pair between the terminal device and the network device may be blocked, leading to a failure; when the terminal device detects that a received signal strength of a downlink signal is less than a preset threshold, the terminal device detects a beam failure, and initiates the beam recovery request. The data scheduling request is a request that is for requesting allocation of a data transmission resource and that is sent by the terminal device to the network device when the terminal device is to send data. The beam adjustment request is a request for adjusting at least one beam pair in a beam pair set after the beam pair set that can be used for communication is established between the network device and the terminal device.

When the request sequence is used at least for requesting beam recovery, in this embodiment of this application, before S101, there is a step in which the terminal device detects the beam failure, to be specific, the terminal device receives a signal sent by the network device by using a serving beam and detects that a received signal strength of the signal is less than the preset threshold. When the terminal device detects the beam failure, the terminal device may first determine whether there is an available beam pair currently. When there is an available beam pair currently, the terminal device sends the request sequence used for requesting beam recovery. The terminal device may receive a signal sent by the network device by using any beam. When the terminal device detects that a received signal strength of the signal is greater than or equal to the preset threshold, the terminal device determines that there is an available beam pair currently, and sends an index number of the signal to the network device. In addition, the indication message may further include at least one of the following: a beam failure cause, a quantity of failed beams, a beam failure status, an index number of an available beam, and quality of the available beam.

When the request sequence is used at least for requesting data scheduling, the indication message further includes a buffer status report (buffer status report, BSR for short), to indicate an amount of to-be-sent data of the terminal device or a quantity of requested resources.

Figure 11:
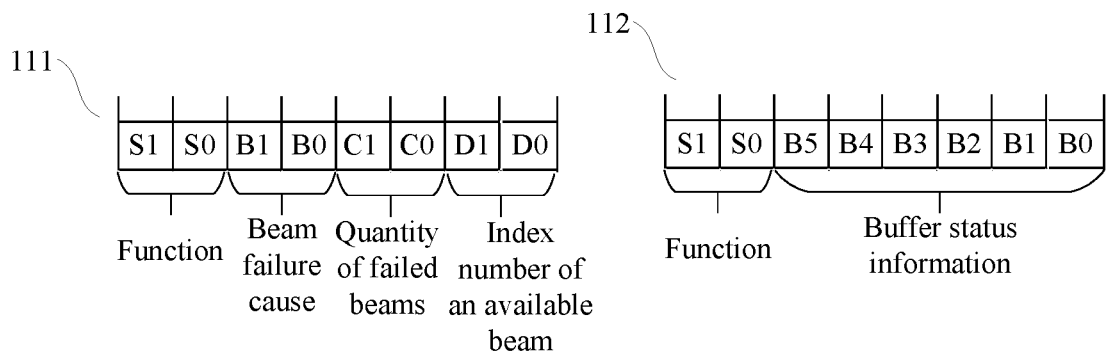
FIG. 11 is a schematic diagram of an indication message according to an embodiment of this application.

FIG. 11 is a schematic diagram of an indication message according to an embodiment of this application. As shown in FIG. 11, the indication message may be implemented by using at least one media access control control element (media access control-control element, MAC CE for short). One MAC CE includes eight bits, or bits of which a quantity is an integral multiple of 8. FIG. 11 shows a MAC CE 111 and a MAC CE 112. The indication message may be implemented by using the MAC CE 111. Bits S1 and S0 in the MAC CE 111 indicate a function of a request sequence. When S1 and S0 are respectively 0 and 1, it indicates that the request sequence is used for requesting beam recovery. Correspondingly, in the MAC CE 111, bits B1 and B0 indicate a beam failure cause, bits C1 and C0 indicate a quantity of failed beams, and bits D1 and D0 indicate an index number of an available beam. The indication message may be implemented by using the MAC CE 112. Bits S1 and S0 in the MAC CE 112 indicate a function of a request sequence.

When S1 and S0 are respectively 0 and 0, it indicates that the request sequence is used for requesting data scheduling. Correspondingly, bits B5 to B0 in the MAC CE 112 indicate buffer status information. Alternatively, the indication message may be implemented by using both the MAC CE 111 and the MAC CE 112. In this case, it indicates that the request sequence is reused for requesting data scheduling and requesting beam recovery, in other words, a terminal device simultaneously initiates a data scheduling request and a beam recovery request.

In FIG. 11, alternatively, the MAC CE 111 may not include any dedicated bits for indicating a function of a request sequence, but include only bits for indicating a beam failure cause, a quantity of failed beams, and an index number of an available beam. Likewise, the MAC CE 112 may not include any dedicated bits for indicating a function of a request sequence, but include only bits for indicating buffer status information. Further, when the MAC CE 111 or the MAC CE 112 does not include any dedicated bits for indicating the function of the request sequence, a logical channel value in the MAC CE 111 or the MAC CE 112 may be used to indicate the function of the request sequence. For example, when the logical channel value is 0, it indicates that the request sequence is used for requesting beam recovery; when the logical channel value is not 0, it indicates that the request sequence is used for requesting data scheduling. Alternatively, a buffer status information value in the MAC CE 111 or the MAC CE 112 may be used to indicate the function of the request sequence. For example, when the buffer status information value is 0, it indicates that the request sequence is used for requesting beam recovery; when the buffer status information value is not 0, it indicates that the request sequence is used for requesting data scheduling.

S140': The terminal device resends the request sequence to the network device.

When the terminal device does not receive, within a preset time, the response message sent by the network device, the terminal device resends the request sequence to the network device. When a quantity of times of sending the request sequence reaches a preset maximum quantity of sending times, the terminal device performs one of the following operations: initiating a random access process, reporting a beam recovery failure, and reporting a radio link failure.

In this embodiment of this application, after receiving the request sequence from the terminal device, the network device allocates, to the terminal device, the time-frequency resource used for uplink transmission. The terminal device reports the actual function of the request sequence to the network device on the time-frequency resource allocated by the network device. Further, the terminal device may report both the actual function of the request sequence and auxiliary information corresponding to the actual function of the request sequence. For example, when the actual function of the request sequence is requesting beam recovery, the auxiliary information includes at least one of the beam failure cause, the quantity of failed beams, the beam failure status, the index number of the available beam, and the quality of the available beam. When the actual function of the request sequence is requesting data scheduling, the auxiliary information includes the BSR.

In this embodiment of this application, the request sequence sent by the terminal device to the network device is not necessarily used for requesting beam recovery, but may be reused for requesting beam adjustment and/or requesting data scheduling. The network device allocates the time-frequency resource to the terminal device in response to the request sequence. The terminal device sends the indication message to the network device on the allocated time-frequency resource, and indicates the actual function of the request sequence in the indication message. The request sequence is reused for several possible requests, so that a large quantity of sequence resources are saved.

Figure 12:
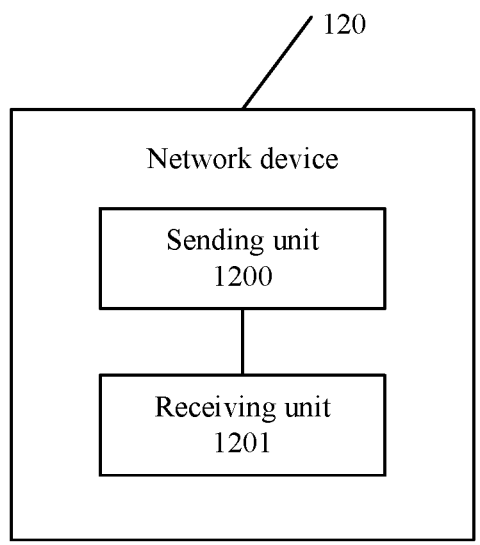
FIG. 12 is a schematic structural diagram of a network device according to an embodiment of this application.

FIG. 12 is a schematic apparatus diagram of a network device according to an embodiment of this application. As shown in FIG. 12, the network device 120 includes a sending unit 1200 and a receiving unit 1201. The sending unit 1200 may be configured to perform S511, S531, and S54. The receiving unit 1201 may be configured to perform S512, S532, and S55.

Figure 13:
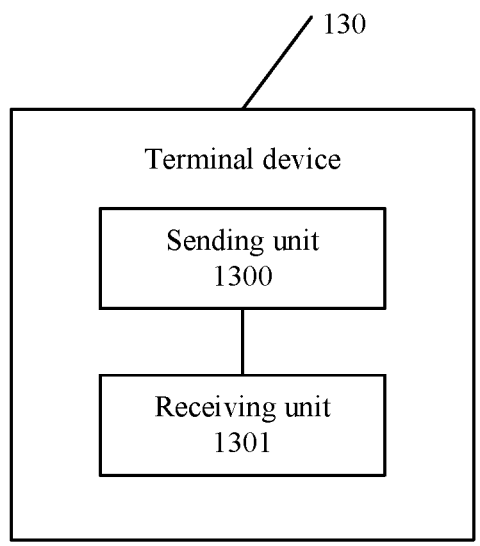
FIG. 13 is a schematic apparatus diagram of a terminal device according to an embodiment of this application.

FIG. 13 is a schematic apparatus diagram of a terminal device according to an embodiment of this application. As shown in FIG. 13, the terminal device 130 includes a sending unit 1300 and a receiving unit 1301. The sending unit 1300 may be configured to perform S102 and S104. The receiving unit 1301 may be configured to perform S101 and S103.

Figure 14:
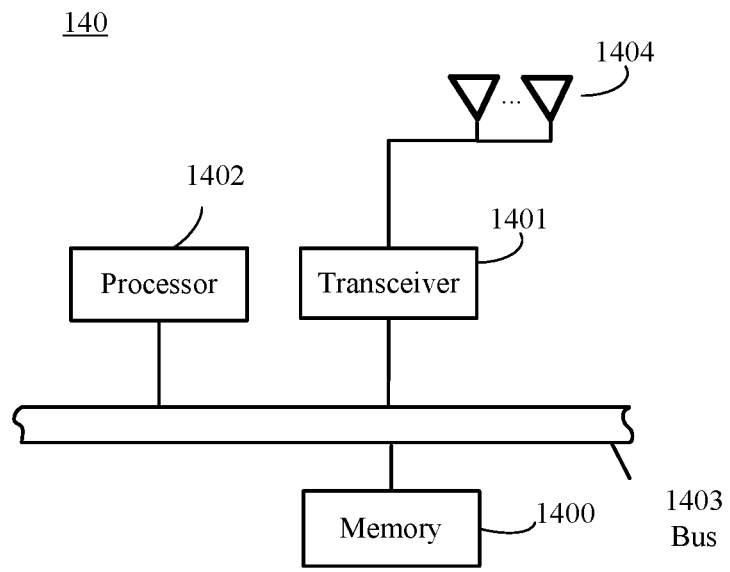
FIG. 14 is a schematic apparatus diagram of another network device according to an embodiment of this application.

FIG. 14 is a schematic apparatus diagram of another network device according to an embodiment of this application. As shown in FIG. 14, the network device 140 includes a memory 1400, a transceiver 1401, and a processor 1402, and may further include a bus 1403 and at least one antenna 1404. The memory 1400 is configured to store program code including a computer operation instruction. The processor 1402 is configured to execute the computer operation instruction, to control the transceiver 1401 to perform S51 to S55 shown in FIG. 5.

Figure 15:
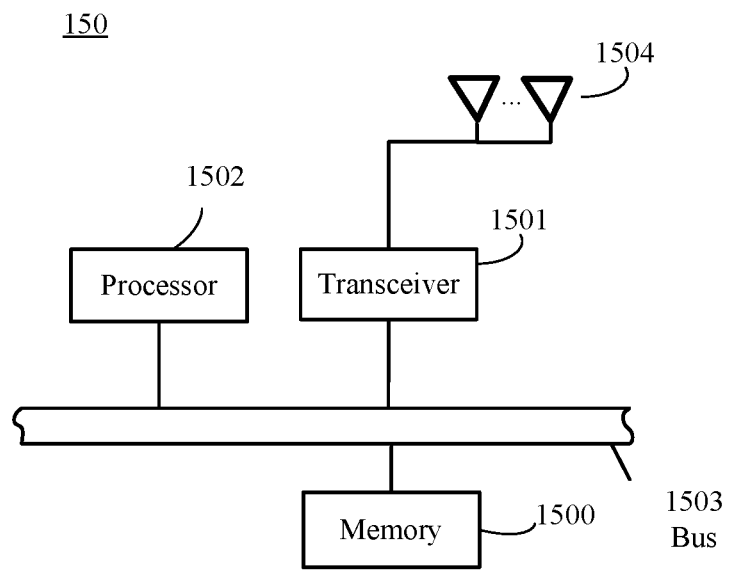
FIG. 15 is a schematic apparatus diagram of another terminal device according to an embodiment of this application.

FIG. 15 is a schematic apparatus diagram of another terminal device according to an embodiment of this application. As shown in FIG. 15, the terminal device 150 includes a memory 1500, a transceiver 1501, and a processor 1502, and may further include a bus 1503 and at least one antenna 1504. The memory 1500 is configured to store program code including a computer operation instruction. The processor 1502 is configured to execute the computer operation instruction, to control the transceiver 1501 to perform S101 to S104 shown in FIG. 10.

It should be understood that the foregoing transceiver may include a transmitter and a receiver. The transceiver may further include one or more antennas. The memory may be a separate component, or may be integrated into the processor. All or some of the foregoing components may be integrated into a chip for implementation, for example, be integrated into a baseband chip for implementation.

The apparatus in implementations of this application may be a field-programmable gate array (Field-Programmable Gate Array, FPGA), may be an application-specific integrated circuit (Application-Specific Integrated Circuit, ASIC), may be a system on chip (System on Chip, SOC), may be a central processing unit (Central Processing Unit, CPU), may be a network processor (Network Processor, NP), may be a digital signal processing circuit (Digital Signal Processor, DSP), may be a microcontroller (Micro Controller Unit, MCU), or may be a programmable controller (Programmable Logic Device, PLD) or another integrated chip.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of ease and brevity of description, for detailed working processes of the foregoing system, apparatus, and unit, reference may be made to corresponding processes in the foregoing method embodiments, and details are not described herein again. For ease and brevity, the method embodiments may also be cross-referenced, and details are not described again.

The term "a plurality of" in this specification means two or more. The terms "first", "second", and the like in this specification are merely intended to distinguish between different objects, but are not intended to limit a sequence of the objects. For example, "a first symbol group" and "a second symbol group" are merely intended to distinguish between different symbol groups, but are not intended to limit a sequence of the symbol groups. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between associated objects. In a formula, the character "/" represents a "divide" relationship between associated objects. The preset thresholds mentioned in the embodiments of this application may be a same preset threshold, or may be different preset thresholds.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions of the embodiments.

In addition, the functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or a compact disc.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer program instruction is loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium, or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for receiving a beam recovery request, wherein the method is applied to a network device and comprises:
    sending a first signal to a terminal device by using a first beam;
    receiving first index information sent by the terminal device, wherein the first index information indicates an index number of the first signal;
    sending a first notification message to the terminal device based on the first index information, wherein the first notification message comprises second index information, wherein the second index information indicates an index number of a second signal, and wherein the index number of the second signal corresponds to the first beam; and
    receiving, on a time-frequency resource corresponding to the first beam, the beam recovery request sent by the terminal device.

2. The method according to claim 1, wherein before the sending a first signal to a terminal device by using a first beam, the method further comprises:
    sending the second signal to the terminal device by using the first beam; and
    receiving third index information sent by the terminal device, wherein the third index information indicates the index number of the second signal.

3. The method according to claim 1, wherein after the sending a first notification message to the terminal device, the method further comprises:
    sending a third signal to the terminal device by using a second beam;
    receiving fourth index information sent by the terminal device, wherein the fourth index information indicates an index number of the third signal; and
    sending a second notification message to the terminal device based on the fourth index information, wherein the second notification message comprises fifth index information, wherein the fifth index information indicates a difference between an index number of a fourth signal and the index number of the second signal, and wherein the index number of the fourth signal corresponds to the second beam.

4. The method according to claim 1, wherein that the second index information indicates an index number of a second signal comprises:
    the second index information indicates that the first signal and the second signal are quasi co-located.

5. The method according to claim 3, wherein the first signal comprises a first channel state information-reference signal (CSI-RS), wherein the second signal comprises a second CSI-RS or a first synchronization signal block (SS block), wherein the third signal comprises a third CSI-RS, and wherein the fourth signal comprises a fourth CSI-RS or a second SS block.

6. A method for sending a message, wherein the method is applied to a terminal device and comprises:
    sending a request sequence to a network device;
    receiving a response message sent by the network device, wherein the response message indicates a time-frequency resource that the network device allocates to the terminal device in response to the request sequence, wherein the response message is scrambled by using a radio network temporary identifier (RNTI), and wherein the RNTI is obtained by using a preset function and at least one of an index number of the request sequence, an index number of a time resource for sending the request sequence, and an index number of a frequency resource for sending the request sequence; and sending an indication message to the network device on the time-frequency resource, wherein the indication message indicates that the request sequence is used for at least one of the following: requesting beam recovery, requesting data scheduling, and requesting beam adjustment.

7. The method according to claim 6, wherein when the request sequence is used at least for requesting beam recovery, the indication message further comprises at least one of the following:

a beam failure cause, a quantity of failed beams, a beam failure status, an index number of an available beam, and quality of the available beam.

8. The method according to claim 7, wherein the quantity of failed beams is indicated by using a field of the quantity of failed beams, and wherein that the field of the quantity of failed beams is 00, 01, 10, or 11 indicates that the quantity of failed beams is 1, 2, 3, or 4, respectively.

9. The method according to claim 7, wherein the beam failure status is indicated by using a field of the beam failure status, and wherein that the field of the beam failure status is 00 or 01 indicates that the beam failure status is that a current serving beam fails or all serving beams fail, respectively.

10. The method according to claim 6, wherein when the request sequence is used at least for requesting beam recovery, before the sending a request sequence to a network device, the method further comprises:

receiving a first signal sent by the network device by using a first beam; and detecting that a received signal strength of the first signal is less than or equal to a first preset threshold.

11. The method according to claim 6, wherein after the sending a request sequence to a network device, the method further comprises:

if the response message is not received within a preset time, resending the request sequence to the network device; and when a quantity of times of sending the request sequence to the network device reaches a preset maximum quantity of sending times, performing one of the following:

initiating a random access process, reporting a beam recovery failure, and reporting a radio link failure.

12. A network device, comprising:
a transceiver;
a memory, configured to store program code comprising a computer operation instruction; and
at least one processor, the at least one processor configured to execute the computer operation instruction to control the transceiver to perform the following operations:

receiving first index information sent by a terminal device, wherein the first index information indicates an index number of a first signal;

sending a first notification message to the terminal device based on the first index information, wherein the first notification message comprises second index information, wherein the second index information indicates an index number of a second signal, and wherein the index number of the second signal corresponds to a first beam; and receiving, on a time-frequency resource corresponding to the first beam, a beam recovery request sent by the terminal device.

13. The network device according to claim 12, wherein the at least one processor is further configured to control the transceiver to perform the following operations:

sending the second signal to the terminal device by using the first beam; and receiving third index information sent by the terminal device, wherein the third index information indicates the index number of the second signal.

14. The network device according to claim 12, wherein the at least one processor is further configured to control the transceiver to perform the following operations:

sending a third signal to the terminal device by using a second beam;

receiving fourth index information sent by the terminal device, wherein the fourth index information indicates an index number of the third signal; and sending a second notification message to the terminal device based on the fourth index information, wherein the second notification message comprises fifth index information, wherein the fifth index information indicates a difference between an index number of a fourth signal and the index number of the second signal, and wherein the index number of the fourth signal corresponds to the second beam.

15. A terminal device, comprising:
a transceiver;
a memory, configured to store program code comprising a computer operation instruction; and
at least one processor, the at least one processor configured to execute the computer operation instruction to control the transceiver to perform the following operations:

sending a request sequence to a network device;

receiving a response message sent by the network device, wherein the response message indicates a time-frequency resource that the network device allocates to the terminal device in response to the request sequence, wherein the response message is scrambled by using a radio network temporary identifier (RNTI), and wherein the RNTI is obtained by using a preset function and at least one of an index number of the request sequence, an index number of a time resource for sending the request sequence, and an index number of a frequency resource for sending the request sequence; and sending an indication message to the network device on the time-frequency resource, wherein the indication message indicates that the request sequence is used for at least one of the following: requesting beam recovery, requesting data scheduling, and requesting beam adjustment.

16. The terminal device according to claim 15, wherein when the request sequence is used at least for requesting beam recovery, the indication message further comprises at least one of the following:

a beam failure cause, a quantity of failed beams, a beam failure status, an index number of an available beam, and quality of the available beam.

17. The terminal device according to claim 15, wherein when the request sequence is used at least for requesting beam recovery, the at least one processor is further configured to control the transceiver to perform the following operations:

receiving a first signal sent by the network device by using a first beam; and detecting that a received signal strength of the first signal is less than or equal to a first preset threshold.

18. The terminal device according to claim 15, wherein the at least one processor is further configured to control the transceiver to perform the following operations:

if the response message is not received within a preset time, resending the request sequence to the network device; and when a quantity of times of sending the request sequence to the network device reaches a preset maximum quantity of sending times, performing one of the following:

initiating a random access process, reporting a beam recovery failure, and reporting a radio link failure.

\* \* \* \* \*